United States Patent
Vermeersch (10) Patent No.: US 8,602,194 B2
(45) Date of Patent: Dec. 10, 2013

(54) BRAKE-TRANSMISSION SHIFT INTERLOCK ASSEMBLY

(75) Inventor: Michael C. Vermeersch, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1166 days.

(21) Appl. No.: 11/977,398

(22) Filed: Oct. 24, 2007

(65) Prior Publication Data

US 2008/0093194 A1    Apr. 24, 2008

Related U.S. Application Data

(60) Provisional application No. 60/853,818, filed on Oct. 24, 2006.

(51) Int. Cl.
- G05G 11/00 (2006.01)
- F16H 61/22 (2006.01)
- F16H 59/54 (2006.01)

(52) U.S. Cl.
USPC ............... 192/220.4; 200/61.88; 74/483 R (58) Field of Classification Search
USPC ............. 192/220.2, 220.3, 220.4; 74/483 R; 200/61.88; 477/96; 70/248
See application file for complete search history.

(56) References Cited

U.S. PATENT DOCUMENTS

| | | | | |
|---|---|---|---|---|
| 1,674,315 A | * | 6/1928 | Blossom et al. | 70/257 |
| 4,887,702 A | * | 12/1989 | Ratke et al. | 477/96 |
| 4,932,493 A | * | 6/1990 | Sakurai et al. | 180/271 |
| 4,991,700 A | * | 2/1991 | Koga | 192/220.3 |
| 5,009,295 A | | 4/1991 | Kinkade et al. | 192/4 A |
| 5,015,807 A | * | 5/1991 | Ishizuki et al. | 200/61.88 |
| 5,018,610 A | * | 5/1991 | Rolinski et al. | 477/96 |
| 5,027,929 A | | 7/1991 | Ratke et al. | 192/4 A |
| 5,027,931 A | | 7/1991 | Ratke et al. | 192/9 |
| 5,062,509 A | | 11/1991 | Carpenter et al. | 192/4 A |
| 5,181,592 A | * | 1/1993 | Pattock | 192/220.3 |
| 5,314,049 A | | 5/1994 | Nordstrom | 192/4 A |
| 5,489,246 A | | 2/1996 | Moody et al. | 477/96 |
| 5,511,641 A | | 4/1996 | Snell et al. | 192/4 A |
| 5,562,568 A | | 10/1996 | Smale | 477/99 |
| 5,566,581 A | * | 10/1996 | Smale et al. | 74/473.22 |
| 5,582,073 A | | 12/1996 | Takeuchi et al. | 74/473.23 |
| 5,647,465 A | | 7/1997 | Burkhard et al. | 192/4 A |
| 5,729,187 A | | 3/1998 | Moody et al. | 335/228 |

(Continued)

FOREIGN PATENT DOCUMENTS

| EP | 0 347 150 B1 | 6/1989 | G05C 5/08 |
|---|---|---|---|
| EP | 0 356 769 B1 | 8/1989 | F16C 1/12 |

(Continued)

*Primary Examiner* — David D Le
*Assistant Examiner* — Terry Chau
(74) *Attorney, Agent, or Firm* — Cantor Colburn LLP (57) ABSTRACT

A sub-assembly for a brake transmission shift interlock system. The sub-assembly includes an inhibitor for preventing shifting of a vehicle transmission from a park position in the absence of application of a brake by a vehicle occupant, and a solenoid having a movable armature. A linkage couples the inhibitor to the armature such that movement of the armature produces a movement of the inhibitor. The linkage also couples the inhibitor to the armature so as to permit movement of at least a portion of the inhibitor independent of the armature. A brake transmission shift interlock assembly and a switch assembly incorporating the sub-assembly are also provided.

17 Claims, 8 Drawing Sheets

(56) References Cited

U.S. PATENT DOCUMENTS

| | | | |
|---|---|---|---|
| RE35,772 E | 4/1998 | Ratke et al. | 192/4 A |
| 5,752,414 A | 5/1998 | Reasoner et al. | 74/483 R |
| 5,759,132 A * | 6/1998 | Osborn et al. | 477/96 |
| 5,862,899 A | 1/1999 | Dahlstrom | 192/4 A |
| 5,954,179 A | 9/1999 | Osborn | 192/219.5 |
| 6,082,217 A | 7/2000 | Wheeler | 74/483 R |
| 6,142,282 A | 11/2000 | Rudisil et al. | 192/220.4 |
| 6,371,271 B1 * | 4/2002 | Hong | 192/220.3 |
| 6,443,026 B1 | 9/2002 | Arakawa et al. | 74/473.32 |
| 6,592,492 B1 | 7/2003 | Kalia | 477/96 |
| 6,794,972 B2 | 9/2004 | Rudisil et al. | 335/259 |
| 6,879,480 B2 | 4/2005 | Kalia | 361/160 |
| 6,945,377 B2 | 9/2005 | Burr et al. | 192/220.2 |
| 7,189,186 B2 | 3/2007 | Weber et al. | 477/99 |
| 2003/0025581 A1 | 2/2003 | Rudisil et al. | 335/220 |
| 2003/0195082 A1 | 10/2003 | Kalia | 477/96 |
| 2003/0213673 A1 | 11/2003 | Burr et al. | 192/220.2 |
| 2005/0236252 A1 | 10/2005 | Vermeersch et al. | |

FOREIGN PATENT DOCUMENTS

| | | | | |
|---|---|---|---|---|
| EP | 0 372 858 A3 | 12/1989 | | B60K 41/26 |
| EP | 0372858 A2 | 6/1990 | | |
| EP | 0 429 193 B1 | 10/1990 | | F16H 61/22 |
| EP | 0 437 985 B1 | 12/1990 | | F16H 61/22 |
| EP | 0 748 957 A3 | 6/1996 | | F16H 59/10 |
| EP | 0748957 A2 | 12/1996 | | |
| EP | 0 878 366 B1 | 5/1998 | | B60R 25/02 |
| EP | 1 447 290 A1 | 5/1998 | | B60T 1/00 |
| EP | 1 447 291 A1 | 5/1998 | | B60T 1/00 |
| JP | 11206032 | 1/1990 | | |
| JP | 11020632 A | 1/1999 | | B60T 1/05 |
| JP | 2000142159 A | 5/2000 | | B60K 20/02 |
| JP | 200110367 A | 1/2001 | | |
| JP | 2001010367 A | 1/2001 | | B60K 20/02 |
| JP | 2000142159 A | 2/2001 | | |
| JP | 2003146102 A | 5/2003 | | B60K 20/02 |

* cited by examiner

BRAKE-TRANSMISSION SHIFT INTERLOCK ASSEMBLY

CROSS-REFERENCE TO RELATED APPLICATIONS

This application claims the benefit of U.S. Provisional Application Ser. No. 60/853,818 filed on Oct. 24, 2006.

BACKGROUND OF THE INVENTION

The present invention relates to transmission shift mechanisms and particularly to brake-transmission shift interlocks (BTSI) therefor.

Brake transmission shift interlocks (BTSI) are well-known, and prevent an automobile transmission from being shifted from the park position without the brake pedal first being depressed. BTSI prevents accidental movement of the vehicle. U.S. Pat. Nos. 5,647,465 and 6,945,377, and US Patent Application Publication No. 2005-0236252-A1, the complete disclosures of which are incorporated herein by reference, describe various embodiments of such devices.

BTSI typically provide a solenoid that serves as a park position unlocking device, which permits shifter movement from the park position only under certain conditions. The solenoid has an armature which is normally extended as by the biasing force of a spring, and which is retracted from its normal (unpowered) position when activated in response to a signal indicating that moving the shifter from the park position is permissible.

Figure 1:
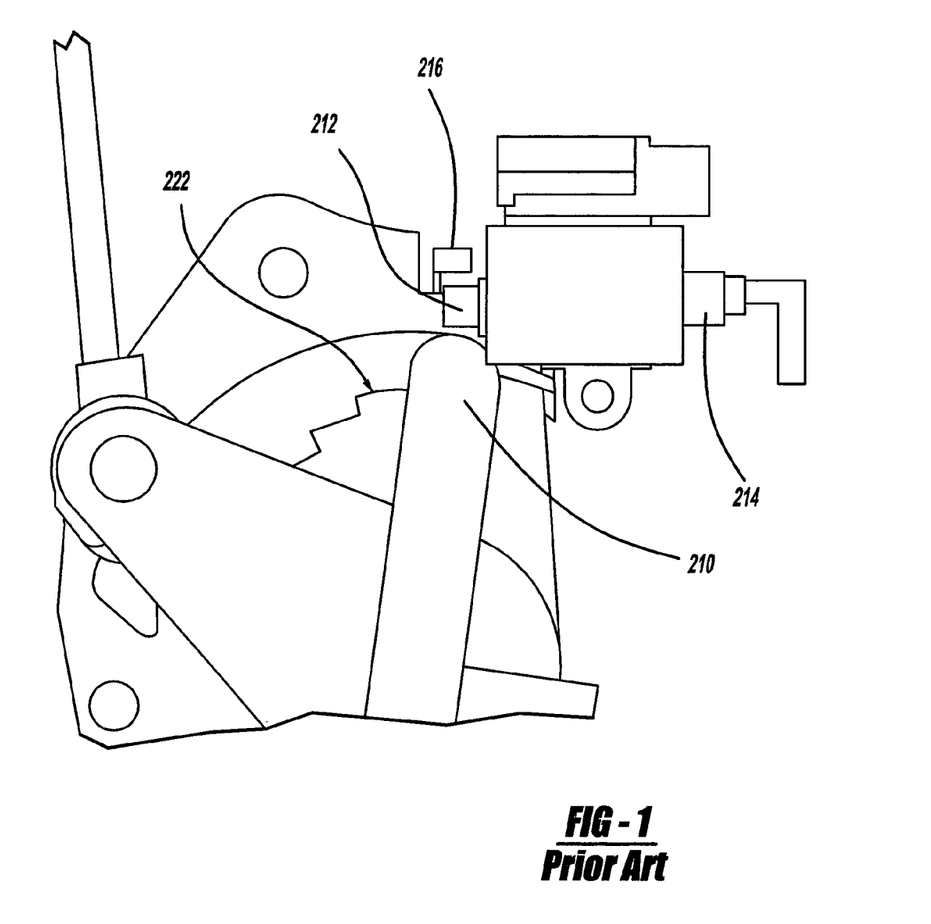
FIG. 1 is an embodiment of a prior shifter mechanism including BTSI, shown in the park position.

In the solenoid's extended position, an inhibitor connected to the armature is positioned such that the shift lever pawl is blocked from being removed from the park detent in the shifter gate. Shifting from the park position is thus prevented. An example of an existing BTSI is shown in FIG. 1, wherein shifting the transmission out of the park position will move the shift lever pawl 210 upwards and into contact with the inhibitor 212 rigidly attached to or integrally formed with the solenoid armature 214. Lateral movement of the inhibitor 212 is restricted by a travel stop 216 provided on the shifter bracket. Movement of the pawl 210 out of the park detent and into the shift gate 222, wherein it can be moved to the reverse and other shifter positions, can only occur once the solenoid armature 214 has been retracted, and the inhibitor 212 thus removed from the path of the pawl 210 as it moves towards the travel stop 216.

Figures 2, 3:
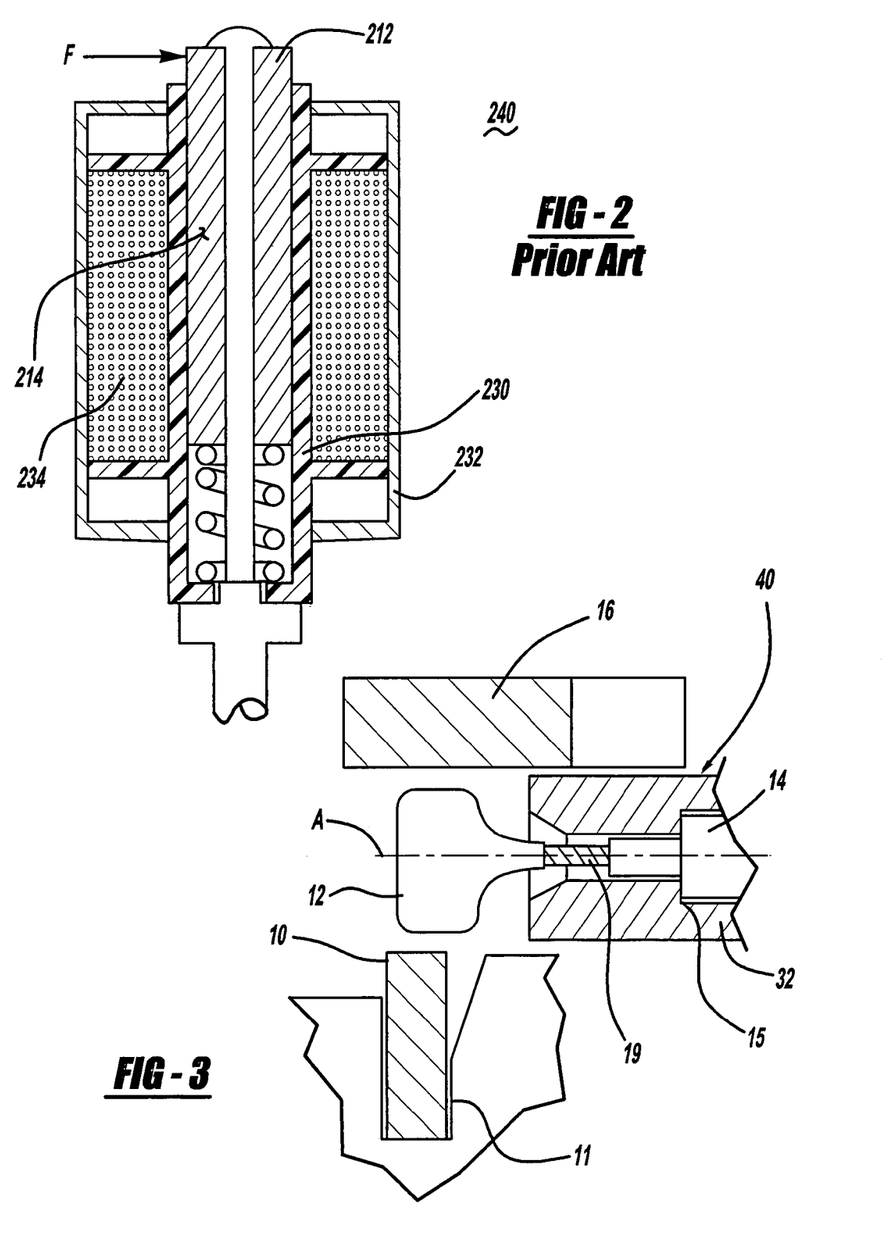
FIG. 2 is a longitudinal section of the solenoid and shift inhibitor of the BTSI shown in FIG. 1.
FIG. 3 is a first embodiment of a BTSI in accordance with the present invention, with the shifter in park position, and the BTSI solenoid is unpowered.

FIG. 2 shows one example of a solenoid 240 employed in existing BTSI. Referring now to FIG. 2, the solenoid includes a metal container 232 and a coil 234 enclosing a portion of the armature 214. In current solenoids used for BTSI, the inhibitor 212 and solenoid armature 214 are of a coupled design whereby lateral forces F exerted on the inhibitor are also exerted on the solenoid armature 214. These solenoids also typically have plastic inserts or bushings 230 used for noise dampening, and to provide an armature location and guidance system. Such coupled BTSI solenoids are sensitive to side loading and cannot withstand the shear side loading imparted on the inhibitor 212, and thus on the armature 214, by the shift lever pawl 210 when its movement from the park detent is opposed during BTSI operation. A BTSI solenoid having an inhibitor that can withstand high compressive loads while not subjecting the armature to potentially damaging high shear loads, whereby solenoid damage can be avoided, is desirable. Such an inhibitor may be characterized as a decoupled inhibitor.

A further problem with some previous BTSI is that the park position detection switch and the BTSI are coupled by design, and rely on the same axial motion to engage each device. Such BTSI require more travel of the link between the solenoid and the park switch to accommodate dimensional stackups of the assembled components and to satisfy the functional requirements of the BSTI system. Thus, a park position switch decoupled from, and which reacts to a motion other than, the BTSI solenoid armature motion when shifting into the park position is desirable, wherein engagement of such a decoupled park position switch is independent of the BTSI solenoid function.

SUMMARY OF THE INVENTION

In accordance with one aspect of the present invention, a sub-assembly for a brake transmission shift interlock system is provided. The sub-assembly includes an inhibitor for preventing shifting of a vehicle transmission from a park position in the absence of application of a brake by a vehicle occupant, and a solenoid having a movable armature. A linkage couples the inhibitor to the armature such that movement of the armature produces a movement of the inhibitor. The linkage also couples the inhibitor to the armature so as to permit movement of at least a portion of the inhibitor independent of the armature.

The linkage decouples the side loads experienced by the inhibitor from the solenoid armature and permits relative lateral or pivotal movement between the inhibitor and armature when subjected to high shear loads during an operator's attempt to move the shifter from its park position. This protects the armature from exessive side loading. The linkage also permits the solenoid armature to retract the inhibitor from the path of the pawl when the solenoid is energized.

As the shifter is returned to the park position with the BTSI unpowered or without the brake being applied, the pawl abuts the inhibitor and urges it out of the way so that the pawl may be placed in the park position and disposed in the park detent. This movement of the inhibitor, which is generally in the direction of armature retraction, imparts movement of the armature through the linkage. Thus, in accordance with the present invention, a BTSI solenoid armature may be forced by the pawl acting on the inhibitor, through the armature-inhibitor linkage against the solenoid's biasing force, into a position in which the pawl may be seated in the park position detent. The armature and the inhibitor coupled to the armature may subsequently be extended such that the inhibitor blocks removal of the pawl from the detent.

In another aspect of the invention, a switch assembly is provided including a brake transmission shift interlock assembly for preventing shifting of a vehicle transmission from a park position in the absence of application of a brake by a vehicle occupant. The interlock assembly includes a solenoid incorporating a movable armature. The switch assembly also includes a vehicle transmission park position switch for detecting the park position of the vehicle transmission. The park position switch includes a movable contact element for opening and closing the park position switch. The contact element is movable independent of the armature. Thus, operation of the park position switch may be decoupled from operation of the solenoid.

DETAILED DESCRIPTION

The following describes various embodiments of a sub-assembly for a brake transmission shift interlock system. Generally, the sub-assembly includes an inhibitor for preventing shifting of a vehicle transmission from a park position in the absence of application of a brake by a vehicle occupant, and a movable solenoid armature. A linkage is also provided coupling the inhibitor to the armature such that movement of the armature produces a corresponding movement of the inhibitor. In addition, the linkage also couples the inhibitor to the armature so as to permit movement of at least a portion of the inhibitor independent of the armature.

Figure 4:
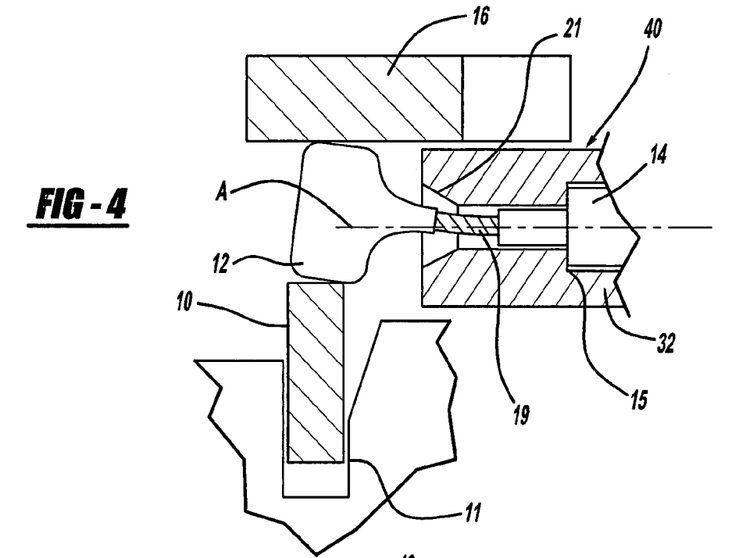
FIG. 4 is the BTSI of FIG. 3 shown inhibiting movement of the shifter from the park position, when the brake is not applied and/or the BTSI solenoid is unpowered.

Referring to FIGS. 3-7, a first embodiment BTSI employs a flexible cable linkage 19 between the inhibitor 12 and armature 14 to decouple the inhibitor 12 from the main armature 14. The inhibitor 12 may be metal or a plastic material suitable for withstanding the compression between the pawl 10 and the structural travel stop 16. FIG. 3 shows the shifter mechanism in the park position, with the pawl 10 seated in the park detent 11 of the shifter gate. The solenoid 40 is unpowered, and its armature 14 is biased by a spring (not shown) into its naturally extending position as shown in FIG. 3, in which attempted movement of the shifter from the park position is met with removal of the pawl 10 from the park detent 11 being blocked by the inhibitor 12, which is disposed between the pawl 10 and the travel stop 16, as shown in FIG. 4. Such inhibited movement of the pawl 10 occurs when the solenoid 40 is unpowered. As seen in FIG. 4, while movement of the armature 14 along axis "A" produces a corresponding movement of the inhibitor 12 along the axis "A", the linkage couples the inhibitor 12 to the armature 14 so as to permit movement of the at the least a portion of the inhibitor 12 in a direction away from the axis (responsive to a force exerted by the pawl 10). Notably, the lateral forces exerted on the inhibitor 12 are not transmitted to the armature 14 through the cable linkage 19. Thus, damage to the solenoid 40 from excessive side loading is prevented. The solenoid 40 may be unpowered when the ignition key is not in the on position or the brake is not applied. Also, as seen in FIG. 4, a chamfer or clearance 21 may be formed on the metal container 32 if needed, to permit pivoting or rotation of the linkage 19 and a portion of inhibitor 12. Portions of container 32 may also be formed so as to provide guide surfaces (such as surfaces 35) and/or travel stops (such as end surface 15) to restrict the motion of the armature.

Figure 5:
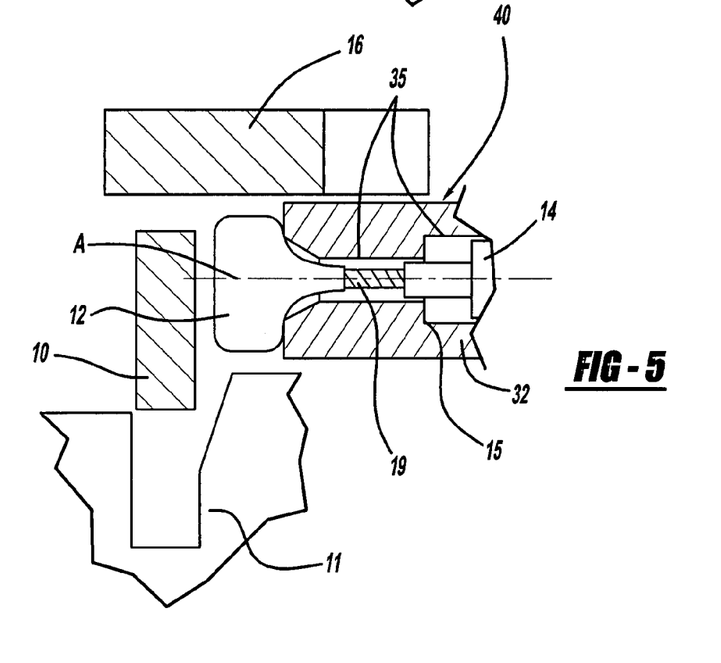
FIG. 5 is the BTSI of FIG. 3 shown not inhibiting movement of the shifter from the park position, when the brake is applied and the BTSI solenoid is powered.

In FIG. 5, the vehicle brake (not shown) is applied and the solenoid (not shown) is powered, thereby retracting the solenoid armature 14 along axis "A," drawing the inhibitor 12 along axis "A" and out of the path of the pawl 10 as the pawl 10 is moved out of the park detent 11. Once the pawl 10 is removed from the detent 11, it can be moved through the shifter gate (not shown) as the operator selects transmission positions other than park. As mentioned previously, the solenoid 14 is provided with guide and alignment features 21, 35 that facilitate proper movement of the inhibitor 12 and armature 14.

Figure 6:
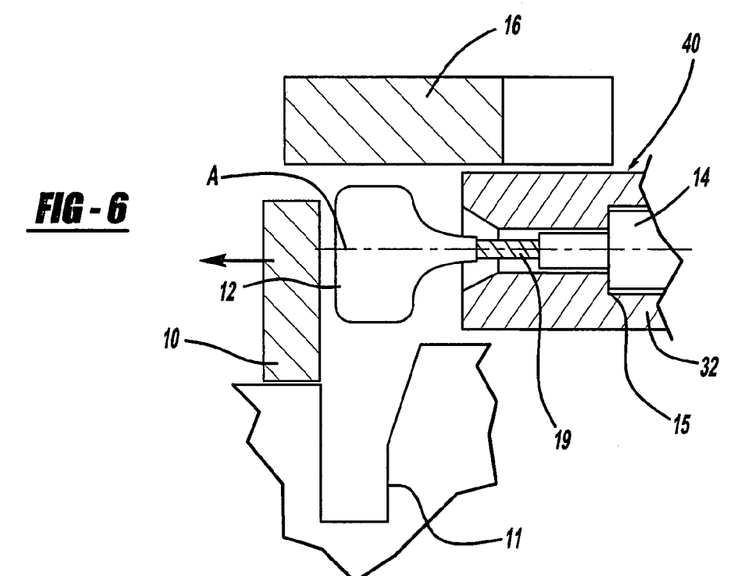
FIG. 6 is the BTSI of FIG. 3 shown during movement of the shifter from the park position to the reverse position, when the transmission switch opens and the BTSI solenoid is consequently unpowered.

In FIG. 6, the shifter (not shown) is moved from the park position towards the reverse position. Once out of the park position, the park position switch (not shown) is opened to de-energize the solenoid and the armature 14 is returned under spring bias to its normal extended position with the inhibitor 12 positioned over the opening of the park detent 11. In the depicted embodiment, the park position switch is not shown and may be located in any of several locations, and may be engageable with the transmission shift linkage (not shown) or be internal to the transmission. The movements of the solenoid armature 14 and park switch (not shown) may also be coupled or decoupled.

Figure 7:
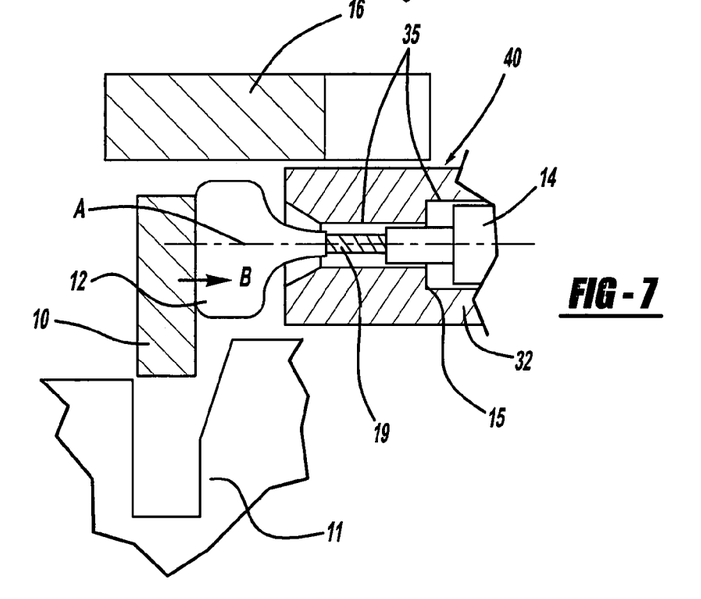
FIG. 7 is the BTSI of FIG. 3 shown during movement of the shifter from the reverse position to the park position, when the brake is not applied and/or the BTSI solenoid is unpowered.

In FIG. 7, the shifter (not shown) is moved from reverse (the position adjacent to the park position) towards the park position. This movement causes the shift lever pawl 10 to move in the direction of arrow B to abut the inhibitor, initially positioned over the park detent 11 under the influence of the armature-biasing spring (not shown), and further movement of the pawl 10 towards a position over the detent forces the inhibitor 12 and unenergized armature against the force of the biasing spring. Joint axial movement of the inhibitor 12 and armature 14 is through the flexible cable 19, which bears the resulting compressive load without kinking or birdcaging (separation of cable strands). Once the pawl 10 is placed in the park detent 11, the biasing spring forces the unenergized armature 14 into its normally extended position with the inhibitor 12 disposed between the pawl 10 and the structural travel stop 16 (see FIG. 3).

Figure 8:
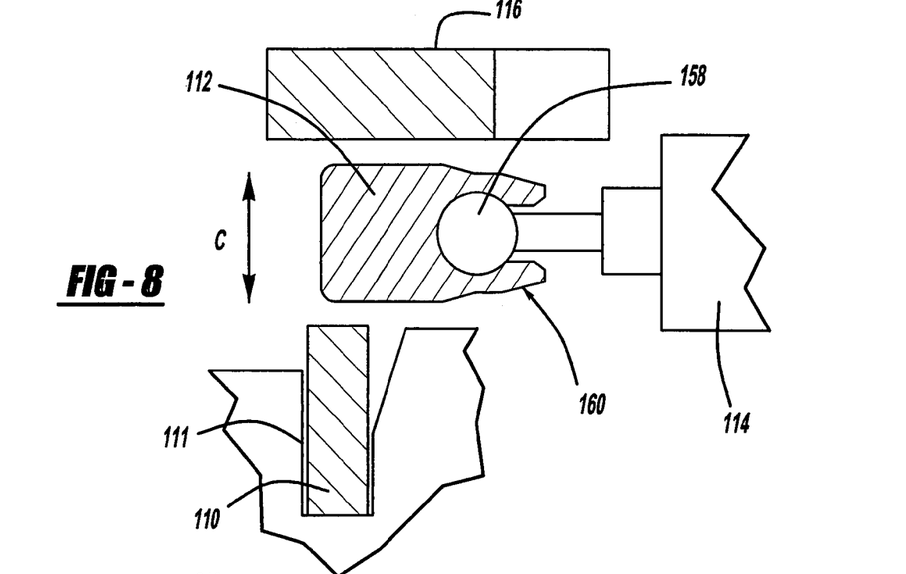
FIG. 8 is a second embodiment of a BTSI in accordance with the present invention, with the shifter in park position, and the BTSI solenoid is unpowered.

FIG. 8 shown a second embodiment of a sub-assembly in accordance with the present invention. In FIG. 8, elements similar to those shown in FIGS. 3-7 have been given similar element numbers. Referring to FIG. 8, the second embodiment BTSI provides a linkage between the inhibitor and the armature that includes a ball stud connection or snap-on ball and socket 160 that allows the inhibitor 112 to pivot in the directions indicated by arrow C relative to the armature 114 as the pawl 110 is blocked from being removed from the park detent 111. The function and operation of the second embodiment BTSI is substantially identical to the first embodiment, although the structure of the linkage 160 between the inhibitor 112 and armature 114 differs. The linkage decouples pivoting motion of the inhibitor 112 from the solenoid armature 114, thereby eliminating side loading on the armature. In the embodiment shown in FIG. 8, a ball portion 158 of the ball-and-socket connection is coupled to the armature 114 and a socket portion of the connection is coupled to (or formed on) the inhibitor 112. Alternatively, the ball portion of the connection may be coupled to the armature and the socket portion of the connection may be coupled to the inhibitor.

Figure 9:
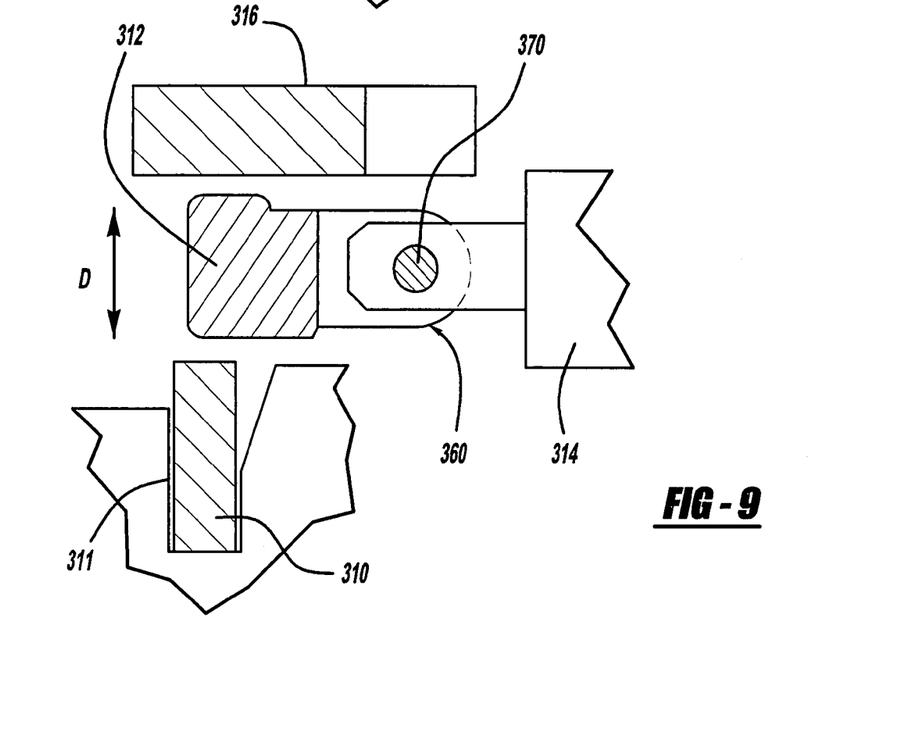
FIG. 9 is a third embodiment of a BTSI in accordance with the present invention, with the shifter in park position, and the BTSI solenoid is unpowered.

Referring to FIG. 9, a third embodiment BTSI provides a linkage 360 between the inhibitor 312 and the armature 314 that includes a pinned hinge between the inhibitor 312 and armature 314. Pivot pin 370 allows the inhibitor 312 to pivot in the directions indicated by arrow D relative to the armature 314 as the pawl is blocked from being removed from the park detent 311. The function and operation of the third embodiment BTSI is substantially identical to the first and second embodiments, although the structure of the linkage between the inhibitor and armature differs. The linkage 360 decouples pivoting motion of the inhibitor 312 from the solenoid, thereby eliminating side loading on the armature 314.

In another aspect of the invention, a brake transmission shift interlock system sub-assembly as described above is incorporated into a switch assembly (generally designated 400). The switch assembly 400 includes a brake transmission shift interlock assembly 490 for preventing shifting of a vehicle transmission from a park position in the absence of application of a brake by a vehicle occupant. The shift interlock assembly includes an interlock sub-assembly as described in one of the previous embodiments. The switch assembly 400 also includes a movable solenoid armature 14. In addition, a vehicle transmission park position switch 494 is provided for detecting the park position of the vehicle transmission. The park position switch 494 includes a movable contact element 496 for opening and closing the park position switch. The contact element 496 is movable independent of the solenoid armature 14.

Figure 10:
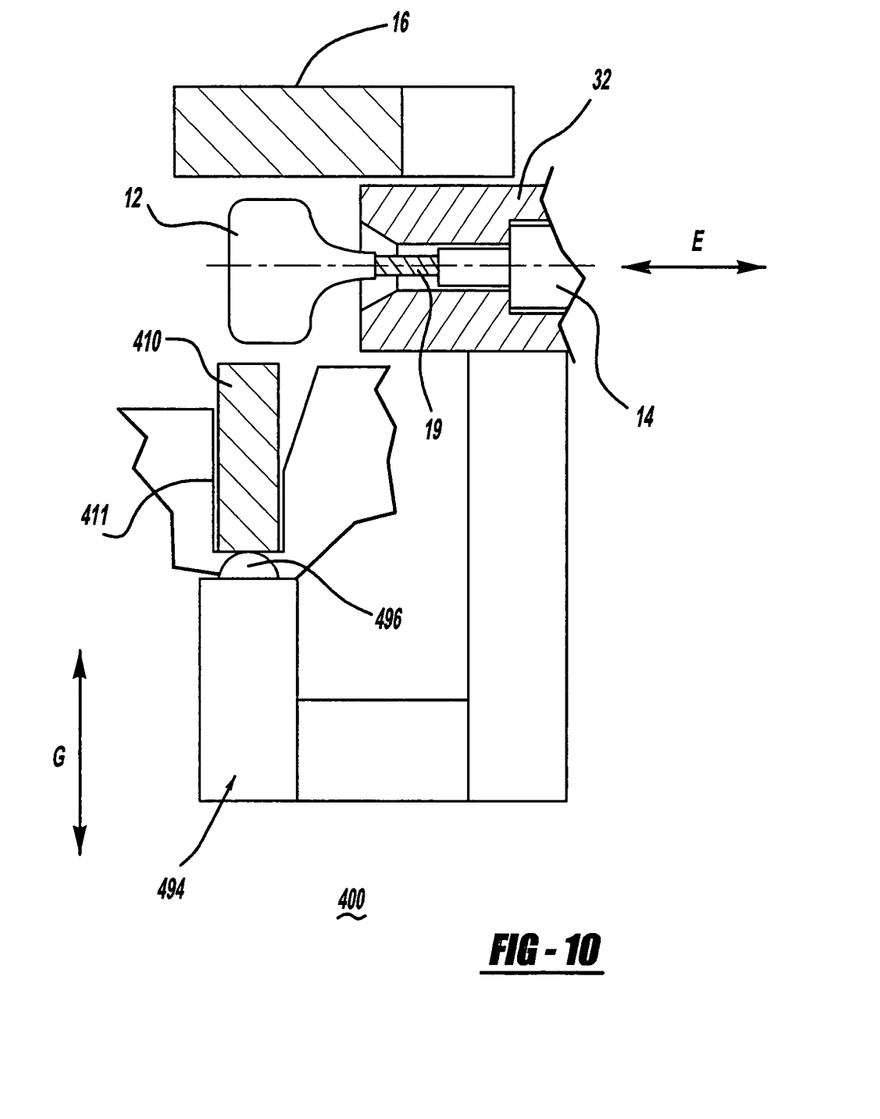
FIG. 10 is the BTSI embodiment of FIG. 3, modified to incorporate an integrated park position switch, shown with the pawl in the park position (switch closed)
Figure 11:
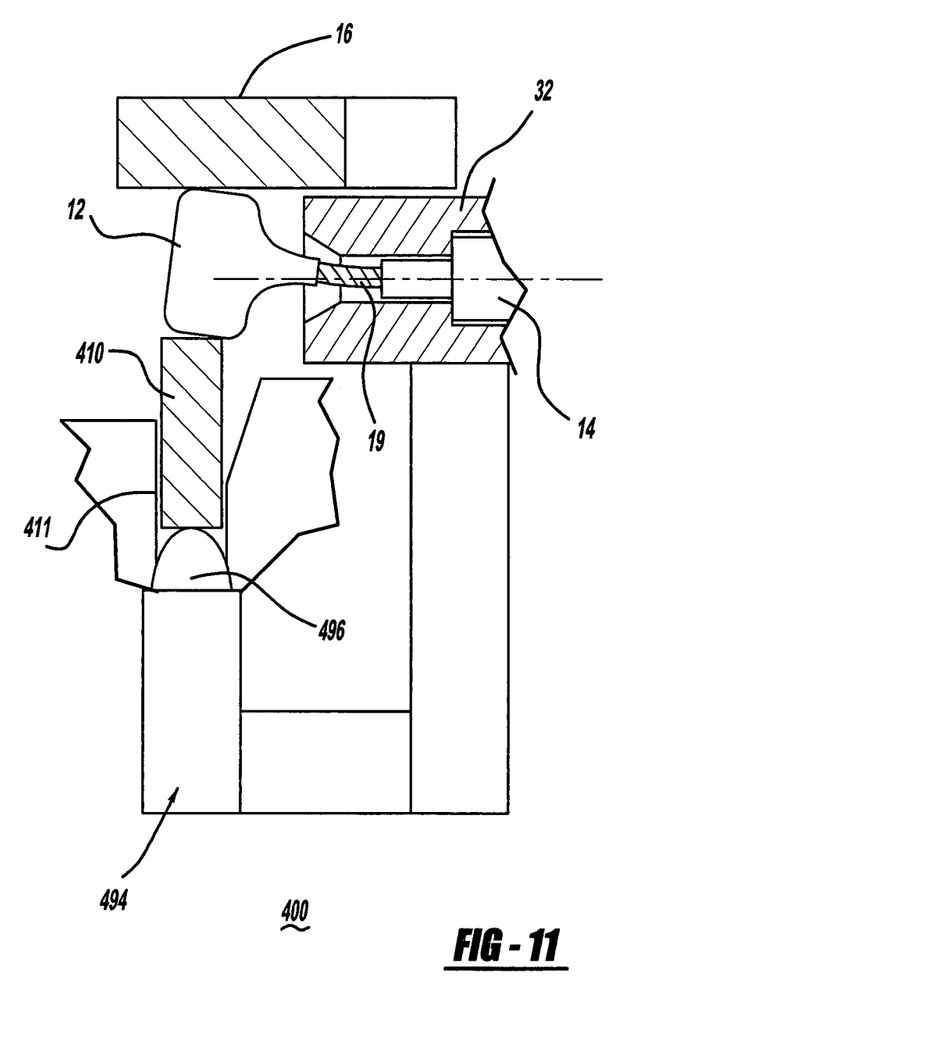
FIG. 11 is the BTSI/park switch of FIG. 10, shown with pawl movement from the park position being blocked by the BTSI inhibitor (switch closed)
Figure 12:
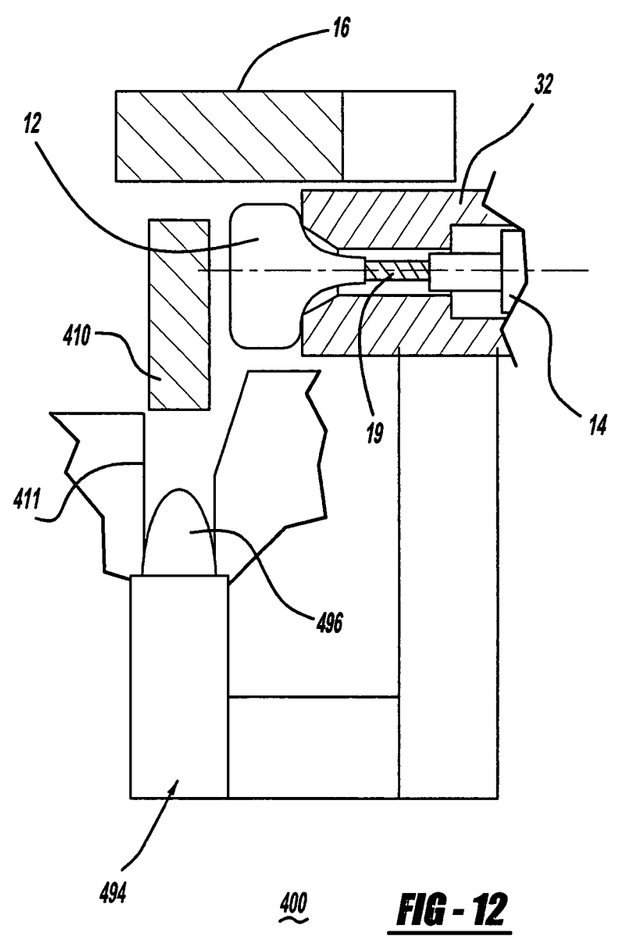
FIG. 12 is the BTSI/park switch of FIG. 10, shown with pawl movement from the park position being permitted by the BTSI inhibitor (switch open).

FIGS. 10-12 show a switch assembly having a park switch 494 integral with the solenoid assembly. Although the switch assembly 400 is shown adapted to the first embodiment BTSI described above, those of ordinary skill in the art will readily appreciate that the above-described second and third embodiments may likewise be modified to incorporate the integral switch assembly 400. The motions of the solenoid armature 14 and park switch plunger 496 are decoupled-movement of one does not necessitate movement of the other.

The park switch plunger 496 is disposed in the park detent 411, and is engaged by the shift lever pawl 410. The plunger is movable within the switch housing in the directions indicated by arrow G. When the pawl 410 is seated in the detent 411, the plunger 496 is fully depressed, and the park switch 494 is closed, thereby preventing the solenoid from being powered. The solenoid armature 14, (which is movable in the directions indicated by arrow E) as discussed above, is unpowered in such circumstances and biased by a spring (not shown) into its normally extended position, the inhibitor 12 being disposed between the pawl 10 and the structural travel stop 16, as shown in FIG. 10.

Referring to FIG. 11, attempted shifting from the park position is blocked by the inhibitor 12. Movement of the pawl 410 from its seated position within the detent 411 permits extending movement of the switch plunger 496, which is biased by a spring (not shown) into its extended position, but even full engagement of the pawl 410 against the inhibitor 12 (wherein the shifter remains locked in the park position) maintains a closed switch position. Only upon application of the brake and the closing a brake switch (not shown) allows the solenoid to become energized and the inhibitor 12 to be moved out of the path of the pawl 410. Only once the pawl 410 is then removed from the park detent 411 (FIG. 12) does the park switch open.

Notably, the park position switch 494 may be used for purposes of verifying to the driver (for example by illuminating a lamp) that the shifter is locked in its park position. Alternatively, those of ordinary skill in the art will appreciate that the park position switch 494 may instead, or also, be used for purposes of controlling activation/deactivation of the BTSI solenoid in conjunction with a brake switch (not shown).

Those of ordinary skill in the art will also recognize that the switch open and closed states described above are merely examples, and the present invention is intended to also encompass embodiments having converse switch open and closed states for carrying out the switch functions. The present invention should therefore not be construed as being limited by the particular switch open and closed states herein described.

The BTSI sub-assembly and assembly of the present invention offer several advantages over existing designs. The decoupled inhibitor can be optimized independently of the BTSI solenoid for size and material. Embodiments of the inhibitor-armature linkage that employ a flexible cable can be optimized for stiffness and compressive strength. The solenoid and inhibitor's guidance/alignment features can be tuned for different deflection requirements. The decoupled BTSI components/features remain on the same integrated solenoid, resulting in lower costs and minimized labor. The decoupled inhibitor does not compromise existing solenoid noise dampening components. The outside diameter of the armature does not need to increased to accommodate higher shear load requirements, thereby facilitating smaller BTSI package sizes. Solenoid durability life is improved due to decoupling armature from side loading. The decoupled inhibitor provides opportunity for increasing tolerances, resulting in less expensive manufacturing and less stringent design parameters.

In addition, the integrated, switch assembly including a decoupled BTSI solenoid and park switch as described herein offer the following advantages: The decoupled park switch motion can be biased by a spring force independent of the spring force that biases the solenoid armature. The guidance/alignment features of the solenoid can be tuned independently of park switch considerations. The decoupled switch and solenoid are integrated into a common component, thereby reducing costs and labor. Reliability is improved through lessened reliance on tolerances required with coupled switches and solenoids of prior BTSI.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A sub-assembly for a brake transmission shift interlock system, the sub-assembly comprising:
   an axially and laterally moveable inhibitor for preventing shifting of a vehicle transmission from a park position in the absence of application of a brake by a vehicle occupant;
   a moveable solenoid armature, the armature having a moveable end that is moveable along an armature axis; and an axially-extending, axially and laterally moveable linkage, the moveable end of the armature coupled by the linkage to the inhibitor that is disposed substantially uniformly about the armature axis and fixed to an end of the linkage away from the armature, the linkage and the inhibitor being laterally moveable relative to the armature axis and axially moveable along the armature axis, wherein the inhibitor is operable in the absence of a pivot axis offset from the linkage;

a vehicle transmission park position switch; and a laterally moveable pawl, the laterally moveable pawl disposed between the inhibitor and the vehicle transmission park position switch.

2. The sub-assembly of claim 1 wherein movement of the armature along an axis produces a corresponding movement of the inhibitor along the axis, and wherein the linkage couples the inhibitor to the armature so as to permit movement of at the least a portion of the inhibitor in a direction away from the axis.

3. The sub-assembly of claim 1 wherein the linkage comprises a cable.

4. The sub-assembly of claim 1 wherein the linkage comprises a ball-and-socket connection.

5. The sub-assembly of claim 4 wherein a ball portion of the ball-and-socket connection is coupled to the armature and a socket portion of the ball-and-socket connection is coupled to the inhibitor such that pivoting of the inhibitor with respect to the ball portion is enabled.

6. The sub-assembly of claim 1 wherein the linkage comprises hinged connection adapted to enable pivoting of the inhibitor.

7. A vehicle including a sub-assembly in accordance with claim.

8. A switch assembly comprising:
brake transmission shift interlock assembly for preventing shifting of a vehicle transmission from a park position in the absence of application of a brake by a vehicle occupant, the assembly including a solenoid incorporating a movable solenoid armature having a moveable end that is moveable along an armature axis, the moveable end coupled by an axially-extending, axially and laterally moveable linkage to an axially and laterally moveable inhibitor that is disposed substantially uniformly about the axis and fixed to an end of the linkage away from the armature, the linkage and inhibitor being laterally moveable relative to the axis and axially moveable along the axis, wherein the inhibitor is operable in the absence of a pivot axis offset from the linkage;

a laterally moveable pawl having a side facing the inhibitor and an opposing side;

the side facing the inhibitor configured to provide a lateral force against the inhibitor;

a vehicle transmission park position switch for detecting the park position of the vehicle transmission;

the park position switch including a movable contact element for opening and closing the park position switch, the moveable contact element configured for releasable contact against the opposing side of the pawl;

wherein the contact element is movable independent of the armature.

9. The switch assembly of claim 8 wherein movement of the armature enables shifting of the vehicle transmission from the park position, and wherein shifting of the vehicle transmission from the park position produces movement of the contact element so as to open the park position switch.

10. The switch assembly of claim 9 wherein the pawl and the contact switch are disposed in a park detent of a shifter gate.

11. The switch assembly of claim 10 wherein the park position switch is opened by movement of the pawl out of the park detent.

12. The switch assembly of claim 8 wherein movement of the armature along the axis produces a corresponding movement of the inhibitor along the axis, and wherein the linkage couples the inhibitor to the armature so as to permit movement of at the least a portion of the inhibitor in a direction away from the axis.

13. The switch assembly of claim 8 wherein the linkage comprises a flexible cable.

14. The switch assembly of claim 13 wherein the flexible cable comprises a plurality of strands.

15. The switch assembly of claim 8 wherein the linkage comprises a ball-and-socket connection.

16. The switch assembly of claim 15 wherein a ball portion of the ball-and-socket connection is coupled to the armature and a socket portion of the ball-and-socket connection is coupled to the inhibitor such that pivoting of the inhibitor with respect to the ball portion is enabled.

17. The switch assembly of claim 8 wherein the linkage comprises a hinged connection configured to enable pivoting of the inhibitor.

* * * * *